United States Patent

Ohmae et al.

[11] Patent Number: 5,292,808
[45] Date of Patent: Mar. 8, 1994

[54] MULTI-PHASE STRUCTURE AND PROCESS FOR PRODUCING THE SAME

[75] Inventors: Tadayuki Ohmae; Yoshiki Toyoshima; Kentaro Mashita; Noboru Yamaguchi, all of Chiba; Jinsho Nambu, Tokyo, all of Japan

[73] Assignee: Sumitomo Chemical Company, Limited, Osaka, Japan

[21] Appl. No.: 72,695

[22] Filed: Jun. 7, 1993

Related U.S. Application Data

[63] Continuation of Ser. No. 477,383, Feb. 9, 1990, abandoned.

[30] Foreign Application Priority Data

Feb. 9, 1989 [JP] Japan .................................. 1-31494

[51] Int. Cl.$^5$ .............................................. C08L 77/00
[52] U.S. Cl. ...................................... 525/113; 525/66; 525/179; 525/181; 525/182; 525/183
[58] Field of Search ............... 525/183, 179, 181, 182, 525/66, 113

[56] References Cited

U.S. PATENT DOCUMENTS 5,047,478 9/1991 Ohmae et al. ...................... 525/183

FOREIGN PATENT DOCUMENTS 0258040 3/1988 European Pat. Off. .
0284379 9/1988 European Pat. Off. .

OTHER PUBLICATIONS

Patent Abstracts of Japan, vol. 7, No. 209.
Patent Abstracts of Japan, vol. 13, No. 221.

*Primary Examiner*—Ana L. Carrillo
*Attorney, Agent, or Firm*—Sughrue, Mion, Zinn, Macpeak & Seas

[57] ABSTRACT

A polyamide resin composition having a multi-phase structure and a process for producing the same are disclosed, the composition comprising:

(A) from 60 to 97 parts by weight of a polyamide resin containing at least 2 parts by weight of (A-1) a polyamide resin having a concentration ratio of terminal carboxyl group to terminal amino group of 1.5 or more, (B) from 3 to 40 parts by weight of an ethylene copolymer comprising:
  (a) from 40 to 90% by weight of an ethylene unit,
  (b) from 5 to 60% by weight of an $\alpha,\beta$-unsaturated carboxylic acid alkyl ester unit, and
  (c) from 0.3 to 10% by weight of a maleic anhydride unit, and (C) from 0.01 to 20 parts by weight, per 100 parts by weight of the sum of the components (A) and (B), of a polyfunctional compound having at least two functional groups reactive to a carboxylic anhydride group or a carboxyl group in the molecule thereof, a part of the polyamide resin (A) constituting a matrix phase, the ethylene copolymer (B) constituting a first-order disperse phase, and the rest of the polyamide resin (A) constituting a second-order disperse phase in the first-order disperse phase.

The composition has well-balanced physical properties, such as impact resistance, rigidity, and thermal resistance, and excellent moldability.

A process for producing the above multi-phase structure is also included, in which a part of a polyamide resin constitutes a matrix phase, an ethylene copolymer constitutes a first order dispersed phase, and the rest of the polyamide resin constitutes a second order dispersed phase in the first order dispersed phase.

7 Claims, 3 Drawing Sheets

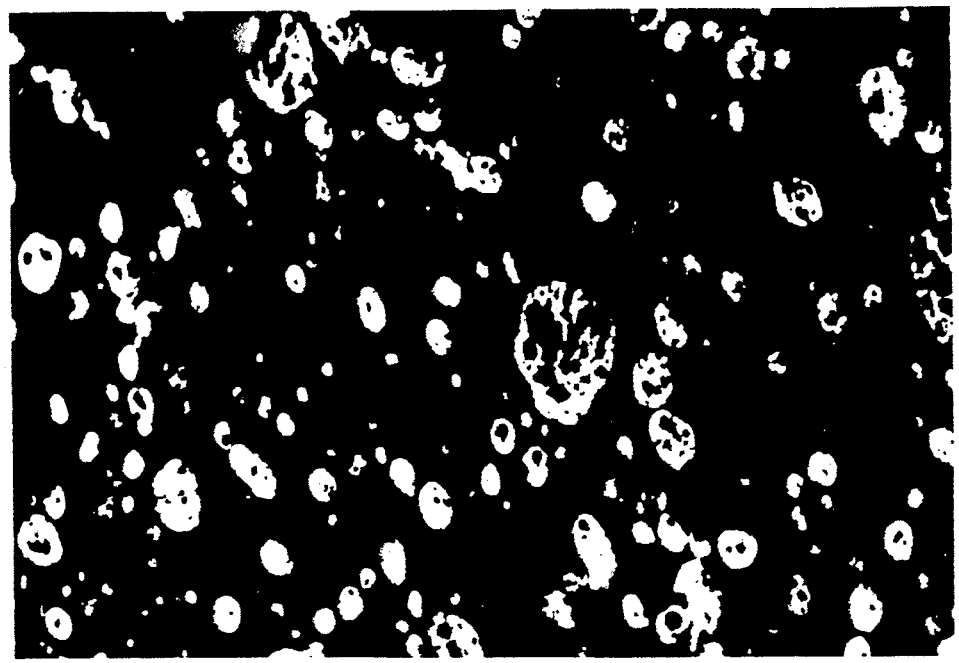
FIG.1 1μ
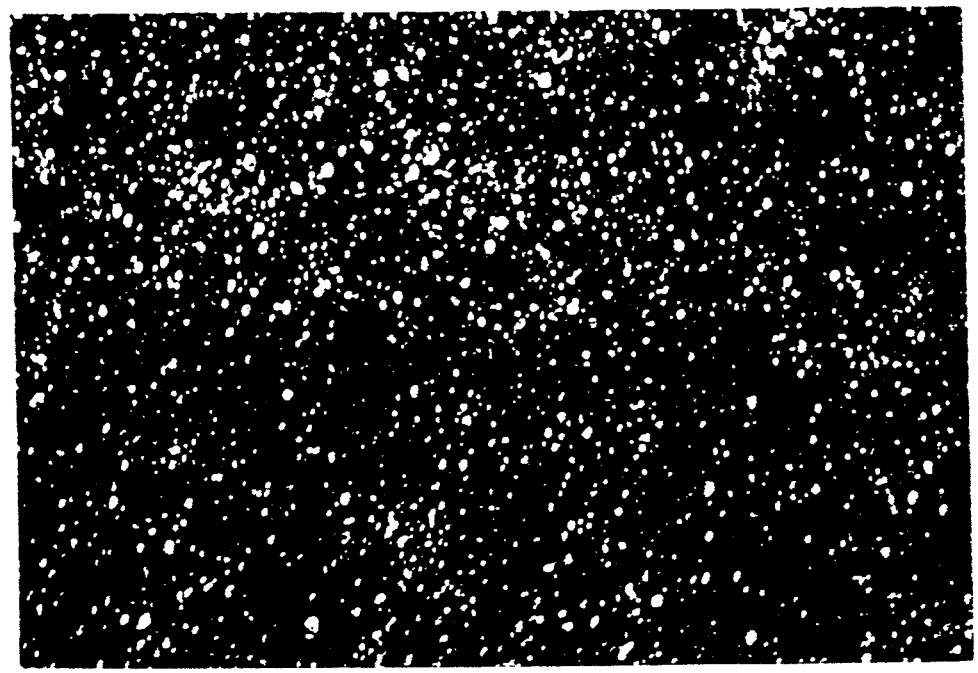
FIG.2 1μ

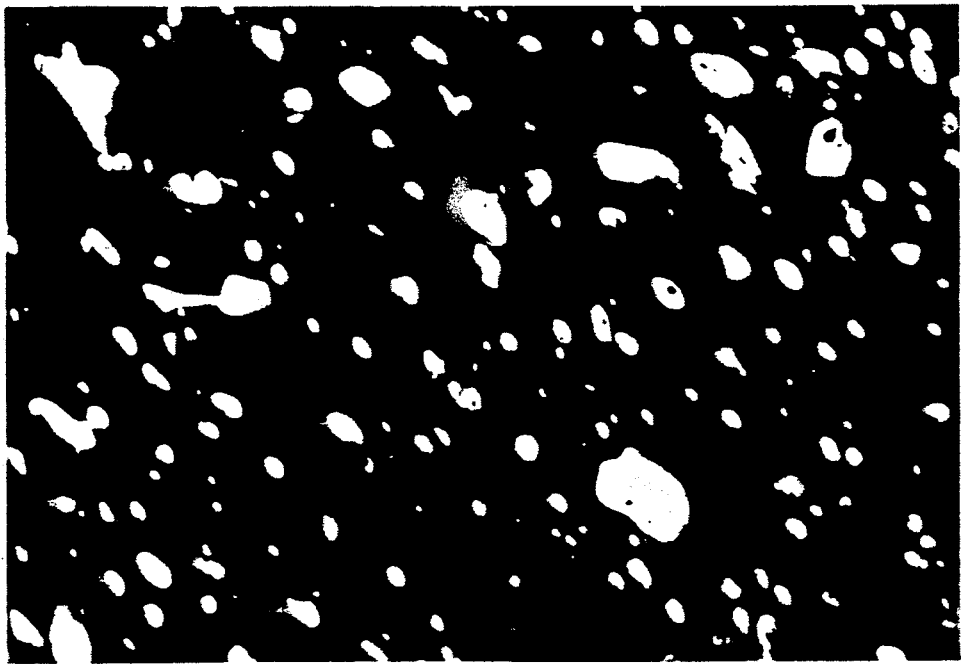
FIG.3  1μ
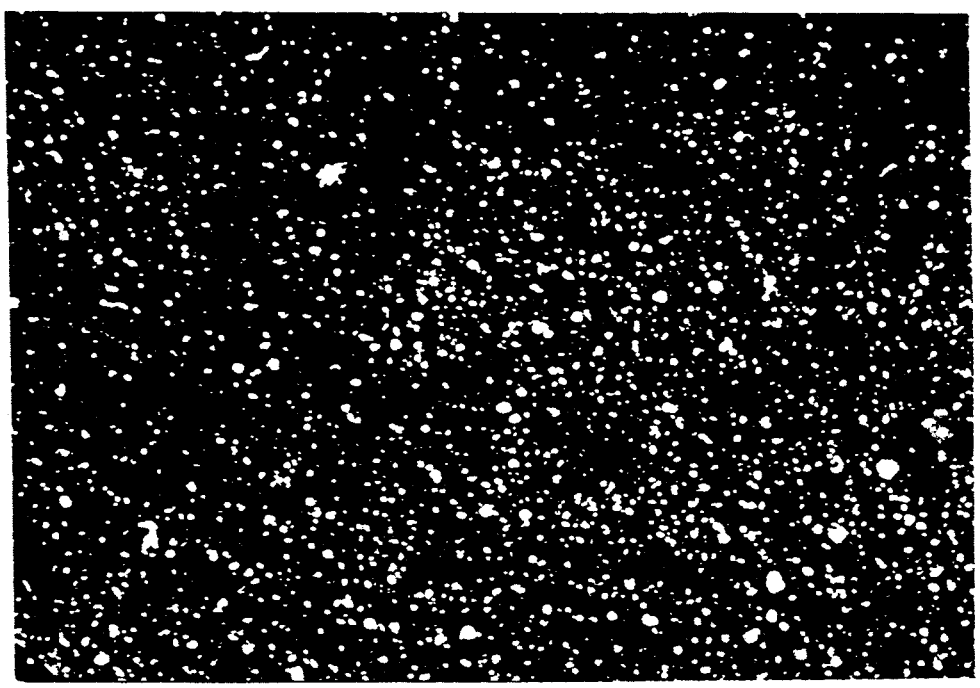
FIG.4  1μ

1μ

1μ

MULTI-PHASE STRUCTURE AND PROCESS FOR PRODUCING THE SAME

This is a continuation of application Ser. No. 07/477,383 filed Feb. 9, 1990 now abandoned.

FIELD OF THE INVENTION

This invention relates to a multi-phase structure of a polyamide resin composition which is excellent in impact resistance and processing fluidity and is easily molded by injection molding or extrusion molding to provide various molded articles, sheets and films and to a process for producing the same. More particularly, it relates to a multi-phase structure of a polyamide resin composition having excellent impact resistance as well as excellent processing fluidity which is obtained by melt-kneading a specific polyamide resin with an ethylene copolymer containing a maleic anhydride unit in a specific compounding mode and to a process for producing the same.

BACKGROUND OF THE INVENTION

Polyamide resins are generally excellent in rigidity, abrasion resistance, chemical resistance, thermal resistance, and electrical characteristics and have therefore been widely employed as engineering plastics.

Polyamide resins, however, still leave room for improvements in impact resistance, molding stability and the like, which have constituted hindrances in exploiting their utility. Thus, various proposals have hitherto been made to improve impact resistance of polyamide resins.

Typical proposals include a reinforced multi-phase thermoplastic resin composition comprising a polyamide having dispersed therein an ethylene copolymer, e.g., an ethylenemaleic anhydride-acrylic ester copolymer, to a particle size of from 0.01 to 1.0 μm as disclosed in JP-B-55-44108 (the term "JP-B" as used herein means an "examined Japanese patent publication"); a high-impact polyamide comprising a polyamide having dispersed therein a maleic anhydride-modified ethylene-propylene rubber to a particle size of not more than 0.36 μm as disclosed in JP-A-60-221453 (the term "JP-A" a used herein means an "unexamined published Japanese patent application"); and a high-impact polyamide resin composition comprising a polyamide having dispersed therein an ionomer resin to a particle size of from 0.005 to 3 μm as disclosed in JP-A-58-108251.

It is well known, as stated above, that properties of a polyamide resin composition greatly depend on the dispersed state, i.e., the micro-phase separation structure, of the constituent polymer. It is hence important to elaborate on the optimum phase separation structure for manifestation of excellent physical properties. Most of the so far proposed impact resistant polyamide resins have revealed through microscopic observation a simple two-phase separation structure (particle structure) called sea-island structure in which a second component having rubbery properties is finely dispersed as a particulate phase (island phase) in a polyamide matrix phase (sea phase).

The latest report, *POLYMER COMMUNICATIONS*, Vol. 29, pp. 163 (1988), describes that polyamide 6.6 and 20% by weight a maleic anhydride-modified ethylene-propylene rubber are melt-kneaded in a 30 mmφ twin-screw extruder to provide a multi-phase structure. According to the examination by the present inventors, however, since the multi-phase structure in this report is unstable, if the compound is further melt-kneaded or a part or the whole of the sprue and runner is recycled to injection molding, etc, it has turned out that the multi-phase structure becomes a sea-island two-phase structure and, also, various physical properties are deteriorated.

It is also known that polyamide resins having a higher terminal amino group concentration give better results as disclosed in JP-B-62-25182, suggesting use of a polyamide resin having a concentration ratio of terminal amino group to terminal carboxyl group of 3.5 or more and in JP-A-59-164359, teaching use of a polyamide resin having a terminal amino group concentration of $5.5 \times 10^{-5}$ eq./g or more. Further, JP-B-61-37305 proposes use of a polyamide resin having a relative viscosity of at least 3.5.

It has also been disclosed in JP-A-63-199755 and JP-A-63-235365 that a combined use of an ethylene-(meth)acrylic ester-maleic anhydride copolymer with a polyfunctional compound as a partial crosslinking agent provides a polyamide resin composition exhibiting fairly improved impact resistance over the conventional polyamide resins, but the composition is still insufficient in maintaining physical properties, such as thermal resistance, rigidity, impact resistance, and processability, in a good balance. That is, the improved impact resistance and softness are offset by other mechanical properties poorer than those of a polyamide resin per se, such as rigidity, tensile strength, hardness, thermal resistance, and processability.

It has turned out that the conventional sea-island structure has its own limit in making a balance between impact resistance and rigidity of a polyamide resin which are conflicting with each other while satisfying molding processability, i.e., high fluidity. In other words, a specific phase separation structure should be established before a material exhibiting impact resistance combined with rigidity, thermal resistance, and moldability can be obtained. None of the above-described conventional techniques is based on this point of view.

SUMMARY OF THE INVENTION

An object of this invention is to provide a two-component system polyamide resin composition comprising a polyamide resin and a specific ethylene copolymer in a multi-phase structure having a specific multi-phase separation structure, which has excellent characteristics, such as impact resistance, rigidity and thermal resistance, and excellent moldability.

Another object of this invention is to provide a process for producing the above-described polyamide resin composition.

The inventors have extensively and intensively investigated modification of a polyamide resin on the basis of the above-described viewpoint. As a result, they have found that a multi-phase structure having well-balanced impact resistance, thermal resistance, rigidity and molding processability can be obtained by melt-kneading a specific polyamide resin, a specific ethylene copolymer, and a specific polyfunctional compound in a specific manner, thus having reached the present invention.

This invention provides a multi-phase structure comprising:
(A) from 60 to 97 parts by weight of a polyamide resin containing at least 2. parts by weight of (A-1) a polyamide resin having a concentration ratio of terminal carboxyl group to terminal amino group of 1.5 or more, (B) from 3 to 40 parts by weight of an ethylene copolymer comprising:
  (a) from 40 to 90% by weight of an ethylene unit,
  (b) from 5 to 60% by weight of an α,β-unsaturated carboxylic acid alkyl ester unit, and
  (c) from 0.3 to 10% by weight of a maleic anhydride unit, and (C) from 0.01 to 20 parts by weight, per 100 parts by weight of the sum of the components (A) and (B), of a polyfunctional compound having at least two functional groups reactive to a carboxylic anhydride group or a carboxyl group in the molecule thereof, a part of the polyamide resin (A) constituting a matrix phase, the ethylene copolymer (B) constituting a first-order disperse phase, and the rest of the polyamide resin (A) constituting a second-order disperse phase in the first-order disperse phase.

This invention further provides a process for producing a multi-phase structure in which a part of a polyamide resin constitutes a matrix phase, an ethylene copolymer constitutes a first-order disperse phase, and the rest of the polyamide resin constitutes a second-order disperse phase in the first-order disperse phase, which comprises:

a step of melt-kneading (A-1) from 20 to 60 parts by weight of a polyamide resin having a concentration ratio of terminal carboxyl group to terminal amino group of 1.5 or more with (B) from 40 to 80 parts by weight of an ethylene copolymer comprising:
  (a) from 40 to 90% by weight of an ethylene unit,
  (b) from 5 to 60% by weight of an α,β-unsaturated carboxylic acid alkyl ester unit, and
  (c) from 0.3 to 10% by weight of a maleic anhydride unit,
to prepare a composition (I), a step of melt-kneading 100 parts by weight of the composition (I) with (C) from 0.01 to 20 parts by weight of a polyfunctional group containing at least two functional groups reactive to a carboxylic anhydride group or a carboxyl group in the molecule thereof to prepare a composition (II), and a step of melt-kneading 100 parts by weight of the composition (II) with from 50 to 1,000 parts by weight of a polyamide resin.

BRIEF DESCRIPTION OF THE DRAWING

FIGS. 1 and 5 each shows a transmission electron micrograph of the multi-phase structure according to the present invention.

FIGS. 2, 3, 4, and 6 each shows a transmission electron micrograph of a particle structure according to the conventional techniques.

DETAILED DESCRIPTION OF THE INVENTION

Figure 5:
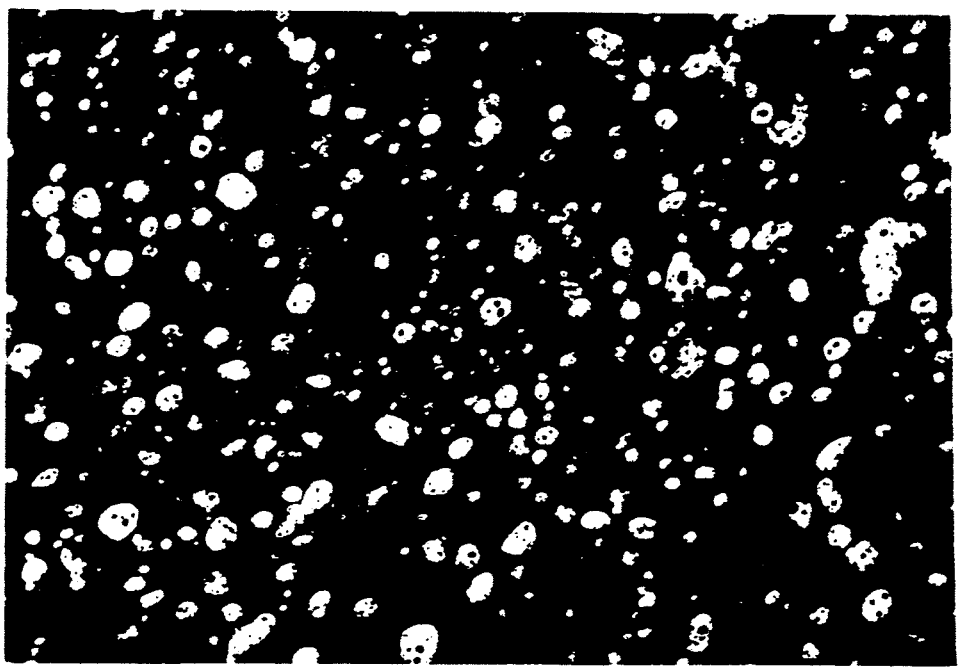

Polyamide resins which can be used in the present invention include various kinds obtainable by polycondensation of a lactam having a ring with at least three members, a polymerizable ω-amino acid, or a dibasic acid and a diamine.

Specifically, there can be mentioned polymers of ε-caprolactam, aminocaproic acid, enantholactam, 7-aminoheptanoic acid, or 11-aminoundecanoic acid; polymers obtained by polycondensation of a diamine (e.g., butanediamine, hexamethylenediamine, nonamethylenediamine, undecamethylenediamine, dodecamethylenediamine, and metaxylenediamine) and a dicarboxylic acid (e.g., terephthalic acid, isophthalic acid, adipic acid, sebacic acid, dodecanedibasic acid, and glutaric acid); and copolymers of these units.

Specific examples of the polyamide resin are aliphatic polyamide resins, e.g., polyamide 4.6, polyamide 6, polyamide 6.6, polyamide 6.10, polyamide 11, polyamide 12, and polyamide 6.12; and aromatic polyamide resins, e.g., poly(hexamethylenediamine terephthalamide) and poly(hexamethylene isophthalamide). Preferred of them are polyamide 6, polyamide 6.6, and polyamide 12.

In addition, various copolymer nylon resins having a melting point of from 80° to 200° C. which are commercially available for use as hot-melt adhesives are also employable either individually or in combination with polyamide resins having a melting point of 200° C. or higher.

In the multi-phase structure of the present invention, the polyamide resin (A) is a polyamide resin containing at least 2 parts by weight of a polyamide resin (A-1) having a concentration ratio of terminal carboxyl group to terminal amino group of 1.5 or more in 60 to 97 parts by weight of a polyamide resin. If the content of the polyamide resin (A-1) is less than 2 parts by weight, a multi-phase structure having well-balanced physical properties cannot be obtained, and the composition is poor in molding processability.

In the process according to the present invention, the polyamide resin (A-1) constituting the composition (I) is a polyamide resin having a concentration ratio of terminal carboxyl group to terminal amino group of 1.5 or more. If this concentration ratio is less than 1.5, a multi-phase structure having well-balanced physical properties cannot be produced, and the finally obtained composition is poor in molding processability. The polyamide resin to be compounded into the composition (II) is not particularly limited, and any kind of polyamide resins may be used.

The ethylene copolymer (B) which can be used in this invention comprises from 40 to 90% by weight, preferably from 65 to 90% by weight, of an ethylene unit (a), from 5 to 60% by weight, preferably from 10 to 35% by weight, of an α,β-unsaturated carboxylic acid alkyl ester unit (b), and from 0.3 to 10% by weight, preferably from 1 to 5% by weight, of a maleic anhydride unit (c).

The α,β-unsaturated carboxylic acid alkyl ester unit (b) is an alkyl ester of an unsaturated carboxylic acid containing from 3 to 8 carbon atoms, e.g., acrylic acid and methacrylic acid. Specific examples of the α,β-unsaturated carboxylic acid alkyl ester unit (b) are methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, and isobutyl methacrylate, with methyl acrylate, ethyl acrylate, n-butyl acrylate, and methyl methacrylate being particularly preferred.

As far as the desired performance properties are assured, ethylene copolymers containing other copolymerizable monomer units, e.g., vinyl acetate and vinyl propionate, may also be used in this invention.

If the content of the ethylene unit (a) in the ethylene copolymer (B) is less than 40% by weight, the resulting polyamide composition has considerably reduced rigidity. If it exceeds 90% by weight, the resulting polyamide composition has reduced impact resistance. If the content of the α,β-unsaturated carboxylic acid alkylester unit (b) in the ethylene copolymer (B) is less than 5% by weight, the effect of improving impact resistance is small. If it exceeds 60% by weight, the resulting composition has considerably reduced rigidity. If the content of the maleic anhydride unit (c) in the ethylene copolymer (B) is less than 0.3% by weight, the composition has insufficient impact resistance, and if it exceeds 10% by weight, molding processability is reduced.

The ethylene copolymer (B) preferably has a melt index of from 1 to 100 g/10 min, more preferably from 2 to 50 g/10 min, as measured according to JIS K6760. If the melt index of the ethylene copolymer (B) exceeds 100 g/10 min, the polyamide composition has insufficient mechanical properties. If it is less than 1 g/10 min, the ethylene copolymer (B) lacks compatibility with a polyamide resin.

The polyfunctional compound (C) which can be used in the present invention is a polyfunctional compound containing at least two functional groups which are reactive to a carboxylic anhydride group or a carboxyl group in the molecule thereof, preferably a polyfunctional compound containing at least two functional groups selected from the group consisting of an amino group, an epoxy group, and a hydroxyl group in the molecule thereof. The polyfunctional compound (C) is not limited in molecular weight and includes high-molecular weight compounds as well. The polyfunctional compound (C) chiefly functions as a partial cross-linking agent for the ethylene copolymer (B) containing the maleic anhydride unit (c), serving to improve various physical properties of the multi-phase structure.

Specific preferable examples of the polyfunctional compound containing two or more amino groups in the molecule thereof include aliphatic diamines, e.g., 1,6-hexamethylenediamine,trimethylhexamethylenediamine,1,4-diaminobutane,1,3-diaminopropane, ethylenediamine, and polyetherdiamine; aliphatic diamine carbamates, e.g., hexamethylenediamine carbamate and ethylenediamine carbamate; aliphatic polyamines, e.g., diethylenetriamine, triethylenetetramine, tetraethylenepentamine,pentaethylenehexamine,ethylaminoethylamine,methyl-aminopropylamine, 2-hydroxyethylaminopropylamine, aminoethylethanolamine, 1,3-bis(3-aminopropoxy)-2,2-dimethylpropane, 1,3,6-trisaminomethylhexane, iminobispropylamine, methyliminobispropylamine, and bis(hexamethylene)-triamine; alicyclic polyamines, e.g., menthenediamine, N-aminoethylpiperazine, 1,3-diaminocyclohexane, isophoronediamine, and bis(4-amino-3-methylcyclohexyl)methane; aliphatic polyamines having an aromatic ring, e.g., m-xylylenediamine; aromatic amines, e.g., diaminodiphenyl ether, 4,4'-methylenedianiline, diaminodiphenylsulfone, benzidine, 4,4'-bis(o-toluidine), 4,4'-thiodianiline, dianisidine,, methylenebis(o-chloroaniline), bis(3,4-diaminophenyl) sulfone, and diaminoditolyl sulfone; polyamines containing silicon, .e.g., 1,3-bis(γ-aminopropyl)-1,1,3,3-tetramethyldisiloxane; amine-modified silicone oils; amine-terminated butadiene-acrylonitrile copolymers; tertiary amine compounds, e.g., N,N,N',N'-tetramethylhexamethylenediamine and N,N,N',N'',N''-pentamethyldiethylenetriamine; ethylene copolymers comprising an ethylene unit and an N,N-dialkylaminoalkyl α,β-unsaturated carboxylic acid ester unit, e.g., an ethylene-N,N-dimethylaminoethyl methacrylate copolymer; and ethylene copolymers comprising an ethylene unit and an N,N-dialkylaminoalkyl α,β-unsaturated carboxylic acid amide unit, e.g., an ethylene-N,N-dimethylaminopropylacrylamide copolymer.

The polyfunctional compound containing two or more epoxy groups in the molecule thereof is roughly divided into epoxy group-containing olefin copolymers and epoxy compounds.

Specific preferable examples of the epoxy group-containing olefin copolymer are copolymers of an olefin and glycidyl methacrylate and/or glycidyl acrylate. The olefin includes ethylene, propylene, butene-1, and isobutylene, with ethylene being preferred. The epoxy group-containing olefin copolymer may further contain, as a copolymerization component, an α,β-unsaturated carboxylic acid alkyl ester or a carboxylic acid vinyl ester, such as alkyl esters of acrylic acid, methacrylic acid, etc., e.g., methyl acrylate, ethyl acrylate, n-butyl acrylate, methyl methacrylate, vinyl acetate, and vinyl propionate. Also included are glycidyl methacrylate-modified ethylene-propylene rubbers and ethylene-methyl acrylateglycidyl methacrylate copolymers.

The epoxy group-containing olefin copolymer may be prepared by any of random copolymerization, block copolymerization, and graft copolymerization. The content of the glycidyl methacrylate unit and/or glycidyl acrylate unit in the copolymer is selected from the range of 1 to 50% by weight. Outside this range, the effects of improving physical properties are insufficient.

The epoxy compound includes glycidyl ethers of bisphenols, e.g., bisphenol A, resorcinol, and hydroquinone, and glycidyl ethers of halogenated bisphenols. Preferred of them are epoxy resins. These epoxy compounds are used either individually or as a mixture of two or more thereof.

In general, the epoxy compound is employed in combination with a curing agent, such as amines, acid anhydrides, polymercaptanes, and phenolic resins. While in the present invention no curing agent is usually used, it may be added, if desired, in such an amount that the amount of active hydrogen of the curing agent is not more than an amount equimolar with the epoxy group-containing component.

Suitable examples of the epoxy resin include bisphenol A type epoxy resins, bisphenol F type epoxy resins, novolak type, epoxy resins, cyclic aliphatic epoxy resins, glycidyl ester type resins, glycidylamine type resins, hydantoin type epoxy resins, and triglycidyl isocyanurate.

The polyfunctional compound containing two or more hydroxyl groups in the molecule thereof includes trimethylolpropane, pentaerythritol, and a saponification product of an ethylene-vinyl acetate copolymer.

Compounds containing two or more dihydroxazolyl groups in the molecule thereof, e.g., 2,2,-(1,3-phenylene)-bis(2-oxazoline) and a styrene-vinyloxazoline copolymer, can also be used as the polyfunctional compound (C).

In the multi-phase structure of the invention, the polyamide resin (A) is present in an amount of from 60 to 97 parts by weight, preferably from 70 to 90 parts by weight; and the ethylene copolymer (B) is present in an amount of from 3 to 40 parts by weight, preferably from 10 to 30 parts by weight. If the content of the polyamide resin (A) is less than 60 parts by weight, rigidity and thermal resistance are insufficient. If it exceeds 97 parts by weight, impact resistance is insufficient.

The amount of the polyfunctional compound (C) in the multi-phase-structure should be adjusted depending on its reactivity to a carboxylic anhydride group or a carboxyl group. It is usually from 0.01 to 20 parts by weight per 100 parts by weight of the sum of components (A) and (B). If the amount is less than 0.01 part by weight, mechanical properties such as thermal resistance and rigidity cannot be effectively improved. Even if it exceeds 20 parts by weight, no further effects can be expected.

In carrying out the process for producing the multi-phase structure according to the present invention, the composition (I) obtained by the first melt-kneading step comprises from 20 to 60 parts by weight of the polyamide resin (A-1) and from 40 to 80 parts by weight of the ethylene copolymer (B). If the content of the polyamide resin (A-1) is less than 20 parts by weight, the finally obtained multi-phase structure does not have sufficient rigidity and thermal resistance. If it exceeds 60 parts by weight, impact resistance of the multi-phase structure is unsatisfactory. While the amount of the polyfunctional compound (C) to be added in the second melt-kneading step should be adjusted taking into consideration reactivity of the polyfunctional compound (C) to a carboxylic anhydride group or a carboxyl group, it usually ranges from 0.01 to 20 parts by weight per 100 parts by weight of the composition (I). If it is less than 0.01 part by weight, mechanical properties of the multi-phase structure, such as thermal resistance and rigidity, are not effectively improved. Even if it exceeds 20 parts by weight, no further effects are obtained. The amount of the polyamide resin to be added in the third melt-kneading step ranges from 50 to 1000 parts by weight per 100 parts by weight of the composition (II). If it is less than 50 parts by weight, rigidity and thermal resistance are insufficient. If it exceeds 1,000 parts by weight, impact resistance is unsatisfactory.

In the present invention, a proportion of a polyamide resin having an amino group at both terminals thereof is minimized as far as possible by using the polyamide resin (A-1) having a concentration ratio of terminal carboxyl group to terminal amino group of 1.5 or more as a part or the whole of the polyamide resin. When a polyamide resin having an amino group at both terminals thereof (hereinafter referred to as PA) is melt-kneaded with the ethylene copolymer (B), there is formed a crosslinked block structure —PA—B—PA—B—PA—, which reduces the function as an adhesive (compatibilizer) between the polyamide resin and the ethylene copolymer, resulting in an increased melt viscosity and a decreased processability. When in sing a polyamide resin having an amino group at one terminal thereof (hereinafter referred to as PA'), a grafted block structure PA'—B—PA' is formed, effectively functioning as an adhesive (compatibilizer) between a polyamide resin and an ethylene copolymer while suppressing an increase in melt viscosity and retaining satisfactory processability.

JP-A-63-199755 and JP-A-63-235365 disclose a combined use of an ethylene-(meth)acrylic ester-maleic anhydride copolymer with a polyfunctional compound as a partial cross-linking agent. However, the polyamide resins used in the working examples of these publications are those having a concentration ratio of terminal carboxyl group to terminal amino group of less than 1.5 as tabulated below.

|  | Polyamide 6 "A1020BRL" | Polyamide 6.6 "A125" |
|---|---|---|
| Concentration of terminal amino group (eq./$10^6$ g) | 60 | 56 |
| Concentration of terminal carboxyl group (eq./$10^6$ g) | 60 | 70 |
| Concentration ratio of terminal carboxyl group to terminal amino group | 1.0 | 1.25 |

As a result, formation of a multi-phase structure is insufficient, and also the multi-phase structure is easily destroyed on melt-kneading in a twin-screw extruder, thus failing to produce sufficient improving effects. Besides, the resulting blend has poor processability due to high melt viscosity.

Hence, the present invention is characterized by using a polyamide resin having a specific terminal group structure as defined above thereby improving the conventional techniques.

The process for producing the multi-phase structure according to the present invention is a process of kneading constituent components in a molten state. Kneading in a molten state (melt-kneading) can be carried out by using generally employed various extruders of single-screw type or twin-screw type, a Banbury mixer, rolls, and various kneaders.

The multi-phase structure of the present invention is like a structure of salami, in which a part of the polyamide resin constitutes a matrix phase, the partially cross-linked ethylene copolymer constitutes a first-order disperse phase which is chemically bonded to the matrix phase, and the rest of the polyamide resin is further dispersed in the first-order disperse phase to constitute a second-order disperse phase which is chemically bonded to the first-order disperse phase.

If the maximum particle size of the first-order disperse phase is too small, not only does crystallinity of the matrix phase tend to be impaired, but molding processability, i.e., flow characteristics, tends to be deteriorated. On the other hand, too a large maximum particle size tends to reduce impact resistance, giving a deteriorated appearance of molded articles. Accordingly, a preferred particle size of the first-order disperse phase ranges from about 0.1 to 10 μm, particularly from 0.2 to 5 μm. Better results are obtained as the ratio of (number of particles greater than 1 μm)/(number of particles smaller than 1 μm) increases. The number of particles of the second-order disperse phase dispersed in the first-order disperse phase is at least two. With the number being only one, sufficient improvements in physical properties such as impact resistance cannot be obtained. The ratio of the second-order disperse phase in the first-order disperse phase is at least 10%, preferably at least 15%, in terms of a crosssectional area ratio determined on a transmission electron miscograph taken by utilizing staining with phosphotungstic acid. If the ratio is less than 10%, the effects of improving physical properties are insufficient.

The chemical bond between the matrix phase and the first-order disperse phase or between the first-order disperse phase and the second-order disperse phase of the multi-phase structure of the present invention is considered to be a chemical bond primarily formed by the reaction between the terminal amino group of the polyamide resin and the acid anhydride group of the ethylene copolymer. It is believed that the chemical bond, too, makes a contribution to improvements of physical properties of the multi-phase structure of the present invention.

By constructing the components into a multi-phase structure as illustrated above, impact resistance as well as flow characteristics, i.e., processability, of a polyamide resin can be improved without reducing thermal distortion resistance or rigidity. Taking into consideration a general tendency that an improvement in impact resistance leads to deterioration in thermal distortion resistance and rigidity, achievement of improvements in impact resistance and also processability without involving reduction of other physical properties by constructing a multi-phase structure according to the present invention is an effect that can never be anticipated from the conventional techniques.

The reason why the multi-phase structure of the present invention exhibits such superior characteristics is considered as follows. As compared with a two-phase structure formed by mere melt-kneading of a polyamide resin and an ethylene copolymer, the surface area of the ethylene copolymer per unit weight in the multi-phase particle structure increases and, as a result, a so much increased amount of a chemical bond is formed between the matrix phase and the first-order disperse phase and between the first-order disperse phase and the second-order disperse phase, whereby impact energy is smoothly absorbed and dissipated in, for example, impact test. Further, since the ethylene copolymer having its melt viscosity increased by partial crosslinking is made a disperse phase with the polyamide resin having satisfactory fluidity at high temperatures being made a matrix phase, it appears that the multi-phase structure exhibits satisfactory melt fluidity characteristics and processability.

While satisfactory physical properties and processability are assured irrespective of conditions of production as long as the multi-phase structure as described above is obtained, preferred processes for producing the multi-phase structure according to the present invention are described below.

The multi-phase structure of the present invention can be produced by a process comprising kneading the constituent components in a molten state. Manners of kneading are roughly divided into the following two processes.

The first process comprises melt-kneading the polyamide resin (A) and ethylene copolymer (B) to prepare a composition and then adding the polyfunctional compound (C) to the composition while the ethylene copolymer constitutes a matrix phase, followed by melt-kneading to conduct a partial crosslinking reaction. In this case, the order and timing of melt-kneading are of great importance. If melt-kneading of the polyamide resin (A) is preceded by melt-kneading of the ethylene copolymer (B) and polyfunctional compound (C), or if the components A), (B), and (C) are melt-kneaded all at once, it seems difficult to obtain the multi-phase structure of the present invention. This is assumably because the ethylene copolymer (B) first reacts with the polyfunctional compound (C) to have an increased viscosity, thereby reducing reactivity with the polyamide resin (A) and, as a result, chemical bonding force between the matrix phase and the first-order disperse phase and between the first-order disperse phase and the second-order disperse phase would be weakened. Since the ethylene copolymer (B) has a lower melting point than the polyamide resin (A), the former constitutes a matrix phase in the initial stage of the melt-kneading of the polyamide resin (A) and ethylene copolymer (B). By addition of the polyfunctional compound (C) while the ethylene copolymer (B) constitutes a matrix phase, the melt viscosity of the ethylene copolymer (B) is increased while inhibiting the polyamide resin (A) present in a larger proportion from phase transition to a matrix phase and stopping the polyamide resin (A) in a state of incomplete phase transition, to thereby form the multi-phase structure according to the present invention. Therefore, addition of the polyfunctional compound (C) after complete phase transition of the polyamide resin (A) to a matrix phase is no more effective to form the multi-phase structure of the invention.

The second process of melt-kneading is the process as described and claimed in the present application. The process according to the present invention comprises a step of melt-kneading the polyamide resin (A-1) and ethylene copolymer (B) to prepare a composition (I) in which the ethylene copolymer (B) constitutes a matrix phase; a step of adding the polyfunctional compound (C) to the composition (I) followed by melt-kneading to cause partial crosslinking to prepare a composition (II); and a step of adding a polyamide resin to composition (II) followed by melt-kneading to produce a multi-phase structure. In the composition (I), the ethylene copolymer forms a stable matrix phase because its proportion to the polyamide resin is relatively high. Addition of the polyfunctional compound to such a stable dispersion results in the production of a multi-phase structure with excellent reproducibility. In general, it is not easy to produce a polymer alloy having a multi-phase structure with good reproducibility. Then, addition of the polyamide resin in the third step accelerates phase transition of the polyamide resin to a matrix phase, but the phase transition is considered to be inhibited because of the increased melt viscosity of the ethylene copolymer which resulted from the addition of the polyfunctional compound. As a result, the phase transition of the polyamide resin appears to stop in an incomplete state to thereby provide the multi-phase structure according to the present invention. The polyamide resin which is added in the third step may be either the same or different from the polyamide resin (A-1). It is preferable to choose a polyamide resin suited for improving physical properties and processability.

In carrying out partial crosslinking in the second step and addition of the polyamide resin in the third step, the polyamide resin (A-1) and ethylene copolymer (B) may be melt-kneaded and pelletized to once obtain the composition (I) in the form of pellets, and the polyfunctional compound (C) is then added followed by melt-kneading and pelletization to obtain the composition (II). Then, a polyamide resin is added thereto, followed by melt-kneading and pelletization. In a preferred embodiment, however, an extruder with side feed openings is employed to produce the multi-phase structure through one stage with good economy. According to this embodiment, the polyamide resin (A-1) and ethylene copolymer (B) are melt-kneaded in the front zone of a barrel to prepare the composition (I), and the polyfunctional compound (C) either in a solid state or in a molten state is fed from a side feed opening provided in the rear zone to prepare the composition (II), and the polyamide resin is successively fed from a different side feed opening in the rear zone, melt-kneaded, and pelletized. It is also possible to dry blend pellets of the composition (II) and the polyamide resin, and the resulting compound is directly molded to obtain a molded article having satisfactory physical properties.

In addition, it is also preferable that the polyfunctional compound (C) is previously melt-kneaded with a resin inert to the polyfunctional compound to prepare a master batch which is then added in an adequate amount in the production of the multi-phase structure.

Prior to kneading, it is preferable to mix each resinous component uniformly in the form of powder or pellets using a tumbler, a Henschel mixer, or the like means. If desired, such mixing may be omitted, and each resinous component may be fed separately to a kneading apparatus in a fixed quantity.

If desired, the resin composition of this invention may further contain other components, such as additives, e.g., pigments, dyes, reinforcements, fillers, heat stabilizers, antioxidants, weathering agents, nucleating agents, lubricants, antistatic agents, flame retarders, and plasticizers; or other polymers, e.g., polyethylene, an ethylene-propylene rubber, a maleic anhydride-grafted modified polyolefin, and a maleic anhydride-grafted modified ethylene-propylene rubber.

Addition of a reinforcement or filler, e.g., various surface-treated glass fibers, carbon fibers, talc, calcium carbonate, and magnesium hydroxide, especially provides a very useful material having high rigidity as well as high impact strength.

The kneaded resin composition according to the present invention can be molded by injection molding, extrusion molding or other various molding techniques.

The present invention is now illustrated in greater detail by way of the following Examples, but it should be understood that the present invention is not construed as being limited thereto. In the following description, all the parts, percents and ratios are given by weight unless otherwise indicated.

Various physical properties of samples prepared in the Examples were measured and evaluated according to the following methods.

1) Flexural Modulus:
 Measured according to JIS K7203. Thickness of specimens: 3.2 mm. Measurement Temperature: 23° C.
2) Izod Impact Strength (V-notched):
 Measured according to JIS K7110. Thickness of Specimens: 3.2 mm. Measurement Temperature: 23° C. or -40° C.
3) Thermal Distortion Temperature:
 Measured according to JIS K7207. Thickness of Specimens: 3.2 mm. Flexure Stress: 4.6 kgf/cm$^2$.
4) Melt Index (MI):
 Measured according to JIS K6760 (load: 2,160 g).
5) Particle Structure:
 The particle structure of a sample was examined by observing a transmission electron micrograph of a specimen. The specimen was prepared by slicing an injection molded sheet with a ultramicrotome and dipping the slice in a phosphotungstic acid solution at 60° C. for 30 minutes to stain the polyamide resin phase.
6) Melting Point:
 Measured with a differential scanning calorimeter (DSC).
7) Relative Viscosity:
 Measured according to a sulfuric acid method of JIS K6810.
8) Terminal Amino Group Concentration:

The terminal amino group of a polyamide resin was determined on an m-cresol solution of a sample by neutralization titration with p-toluenesulfonic acid.
9) Terminal Carboxyl Group Concentration:
 The terminal carboxyl group of a polyamide resin was determined on a benzyl alcohol solution of a sample by neutralization titration with sodium hydroxide.

Polyamide resins, ethylene copolymers, and polyfunctional compounds used in the following Examples and Comparative Examples are shown below.

1) Polyamide Resin

Polyamide 6:
A1022S (manufactured by Unitika, Ltd.):
 MI at 230° C.: 114 g/10 min, relative viscosity: 2.15 dl/g, concentration of terminal amino group: 35 eq./10$^6$ g, concentration of terminal carboxyl group: 86 eq./10$^6$ g, concentration ratio of terminal carboxyl group to terminal amino group: 2.5, melting point: 225° C.
1013B (manufactured by Ube Industries, Ltd.):
 MI at 230° C.: 38 g/10 min, concentration of terminal amino group: 39 eq./10$^6$ g, concentration of terminal carboxyl group: 75 eq./10$^6$ g, concentration ratio of terminal carboxyl group to terminal amino group: 1.9, melting point: 225° C.
A1020BRL (manufactured by Unitika, Ltd.):
 MI at 230° C.: 90 g/10 min, relative viscosity: 2.1 dl/g, concentration of terminal amino group: 84 eq./10$^6$ g, concentration of terminal carboxyl group: 84 eq./10$^6$ g, concentration ratio of terminal carboxyl group to terminal amino group: 1.0, melting point: 225° C.
A1030BRL (manufactured by Unitika, Ltd.):
 MI at 230° C.: 31 g/10 min, relative viscosity: 2.6 dl/g, concentration of terminal amino group: 60 eq./10$^6$ g, concentration of terminal carboxyl group: 60 eq./10 g, concentration ratio of terminal carboxyl group to terminal amino group: 1.0, melting point: 225° C.
A1030BRT (manufactured by Unitika, Ltd.):
 MI at 230° C.: 7 g/10 min, relative viscosity: 3.4 dl/g, concentration of terminal amino group: 42 eq./10$^6$ g, concentration of terminal carboxyl group: 42 eq./10$^6$ g, concentration ratio of terminal carboxyl group to terminal amino group: 1.0, melting point: 225° C.
Polyamide 6.6:
B (manufactured by Ube Industries, Ltd.):
 MI at 280° C.: 150 g/10 min or more, relative viscosity: 2.36 dl/g, concentration of terminal amino group: 47 eq./10$^6$ g, concentration of terminal carboxyl group: 86 eq./10$^6$ g, concentration ratio of terminal carboxyl group to terminal amino group: 1.8, melting point: 261° C.
A2020B (manufactured by Unitika, Ltd.):
 MI at 280° C.: 49 g/10 min, relative viscosity: 2.63 dl/g, concentration of terminal amino group: 38 eq./10$^6$ g, concentration of terminal carboxyl group: 102 eq./10$^6$ g, concentration ratio of terminal carboxyl group to terminal amino group: 2.68, melting point: 261° C.
A125 (manufactured by Unitika, Ltd.):
 MI at 280° C.: 68 g/10 min, relative viscosity: 2.70 dl/g, concentration of terminal amino group: 56 eq./10⁶ g, concentration of terminal carboxyl group: 70 eq./10⁶ g, concentration ratio of terminal carboxyl group to terminal amino group: 1.25, melting point: 256° C.

2) Ethylene Copolymer (B)

Copolymer-1:
E/EA/MAH=71.9/25.0/3.1; MI (190° C.): 33 g/10 min; Melting Point: 68° C.

Copolymer-2:
E/MA/MAH 70.2/27.8/2.0; MI (190° C.): 15 g/10 min; Melting Point: 67° C.

Abbreviations used above have the following meanings:
E: ethylene
EA: ethyl acrylate
MAH: maleic anhydride
MI: melt index Ethylene copolymers-1 and 2 can be prepared by the methods described in JP-A-61-60708 and JP-A-61-60709.

3) Polyfunctional Compound (C)

MB-1:
Master batch prepared by melt-kneading 5 parts of hexamethylenediamine carbamate and 95 parts of Grilon ® CF 6S (copolymer polyamide resin produced by EMS Chemie AG) at 150° C. by means of a vented 30 mmφ single-screw extruder.

MB-2:
Master batch prepared by melt-kneading 10 parts of hexamethylenediamine carbamate and 90 parts of Grilon ® CF 6S at 150° C. by means of a vented 30 mmφ single-screw extruder.

Bondfast ®:
Ethylene/glycidyl methacrylate copolymer produced by Sumitomo Chemical Co., Ltd.; glycidyl methacrylate unit content: 12%; MI (190° C.): 3 g/10 min.

EXAMPLES 1 AND 2

A vented 30 mmφ (L/D=40) twin-screw extruder having two side feed openings (F1, F2) was used as a melt-kneading apparatus. F1 and F2 were on the points trisecting the extruder barrel, and the vent was on the extruder die side.

A polyamide resin (A-1), an ethylene copolymer (B), a polyfunctional compound (C), and a polyamide resin each shown in Table 1 below were melt-kneaded at 260° C. and pelletized using the above-described extruder in such a manner that the polyamide resin (A-1) and ethylene copolymer (B) were fed from the main feed opening, the polyfunctional compound (C) was then fed from F1, and the polyamide resin was successively fed from F2. The pellets were dried at 80° C. for 12 hours to obtain a resin composition. The melt index of the resulting composition was as shown in Table 1.

The composition was molded by the use of a 10-ounce injection molding machine "Model IS-150-V" (manufactured by Toshiba Corporation) at a resin temperature of 260° C. and at a mold temperature of 70° C. to prepare test specimens for measurement of physical properties.

The flexural modulus, Izod impact strength (notched), and thermal distortion temperature of the specimens are shown in Table 1. Transmission electron microscopic observation of a slice cut from the cross section of the molded specimen revealed a multi-phase structure of particles.

The transmission electron micrograph of the multi-phase structure obtained in Example 1 is shown in FIG. 1. In FIG. 1, the black part is a stained polyamide resin phase, and the white part is an ethylene copolymer phase. It can be seen that the polyamide resin constitutes a matrix phase and also constitutes a second-order disperse phase in a first-order disperse phase comprising the ethylene copolymer. The particle size of the first-order disperse phase is from 0.2 to 5 μm. The polyamide resin constituting the second-order disperse phase is more finely dispersed in the first-order disperse phase.

COMPARATIVE EXAMPLE 1

A polyamide resin composition was produced in the same manner as in Example 1, except for replacing MB-1 with Grilon ® CF 6S. The results obtained are shown in Table 1 below. An electron micrograph of the resulting molded product is shown in FIG. 2.

As is shown in FIG. 2, the molded product obtained from the composition of Comparative Example 1 revealed a fine dispersion having no multi-phase structure. Further, the composition has poor melt fluidity and fairly inferior Izod impact strength.

COMPARATIVE EXAMPLE 2

A polyamide resin composition was produced in the same manner as in Example 1, except that polyamide resin (A-1), ethylene copolymer (B), and polyfunctional compound (C) each shown in Table 1 below were fed all at once to the same twin-screw extruder as used in Example 1 from the main feed opening, melt-kneaded at 260° C., pelletized, and dried at 80° C. for 12 hours. The results obtained are shown in Table 1 and FIG. 3.

Observation on the phase separation structure (FIG. 3) revealed a dispersion of giant particles having no multi-phase structure. Further, the composition was very poor in Izod impact strength.

COMPARATIVE EXAMPLES 3 AND 4

A polyamide resin composition was produced in the same manner as in Example 1, except for using a polyamide resin having a concentration ratio of terminal carboxyl group to terminal amino group of less than 1.5 as shown in Table 1 below. The results obtained are shown in Table 1. A transmission electron micrograph of the molded product obtained in Comparative Example 3 is shown in FIG. 4.

Electron microscopic observation on the composition of Comparative Example 3 revealed a fine dispersion having substantially no multi-phase structure. Further, the compositions of Comparative Examples 3 and 4 had poor melt fluidity and inferior Izod impact strength.

EXAMPLE 3

A polyamide resin composition was produced in the same manner as in Example 1, except for carrying out melt-kneading at 280° C. and carrying out injection molding at 290° C. The results obtained are shown in Table 1 and FIG. 5.

Electron microscopic observation on the phase separation structure (FIG. 5) revealed a multi-phase structure similar to that of Example 1.

COMPARATIVE EXAMPLE 5

Figure 6:
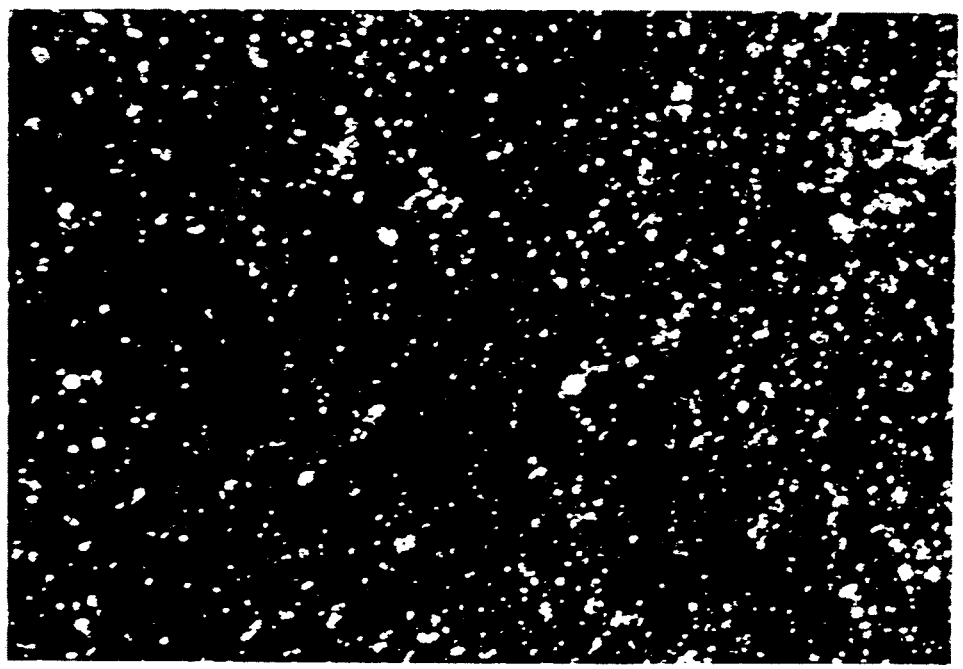

A polyamide resin composition was produced in the same manner as in Example 3, except for using a polyamide resin having a concentration ratio of terminal carboxyl group to terminal amino group of less than 1.5 as shown in Table 1. The results obtained are shown in Table 1 and FIG. 6.

Electron microscopic observation on the phase separation structure (FIG. 6) revealed a fine dispersion having substantially no multi-phase structure. Further, the composition had poor melt fluidity and inferior Izod impact strength.

As described above, the multi-phase structure in accordance with the present invention is obtained by specifying a compounding ratio and a manner of melt-kneading of the constituent components, i.e., a polyamide resin, an ethylene copolymer, and a partial crosslinking agent (polyfunctional compound). It has a novel phase separation structure in which a part of the polyamide resin constitutes a matrix phase, the partially crosslinked ethylene copolymer constitutes a first-order disperse phase, and the rest of the polyamide resin is dispersed in the first-order disperse phase to constitute a second-order disperse phase.

The multi-phase structure having such a phase separation structure provides a resin molding material having well-balanced physical properties, such as impact resistance, rigidity, and thermal resistance, while exhibiting satisfactory moldability (fluidity).

In particular, by limiting a concentration ratio of terminal carboxyl group to terminal amino group of the polyamide resin to be employed, improvements are added to the conventional techniques thereby obtaining satisfactory physical properties and moldability in a stable manner.

While the invention has been described in detail and with reference to specific embodiments thereof, it will be apparent to one skilled in the art that various changes and modifications can be made therein without departing from the spirit and scope thereof.

What is claimed is:

1. A multi-phase structure comprising:
   (A) from 70 to 97 parts by weight of a polyamide resin containing
     (A-1) at least 2 parts by weight, per 100 parts by weight of the sum of the components (A) and (B), of a polyamide resin having a concentration ratio of terminal carboxyl group to terminal amino group of 1.5 or more,
   (B) from 3 to 30 parts by weight of an ethylene copolymer comprising:
     (a) from 40 to 90% by weight of an ethylene unit,
     (b) from 5 to 60% by weight of an $\alpha,\beta$-unsaturated carboxylic acid alkyl ester unit, and
     (c) from 0.3 to 10% by weight of a maleic anhydride unit,
   with the sum of the components (a), (b) and (c) being 100% by weight, and
   (C) from 0.01 to 20 parts by weight, per 100 parts by weight of the sum of the components (A) and (B), of a compound selected from the group consisting of an aliphatic diamine carbamate, an aliphatic polyamine, an alicyclic polyamine, an aromatic

TABLE 1

| Example No. | Polyamide Resin (A-1) Kind and Amount (part) | Polyamide Resin (A-1) COOH/NH Ratio[*2] | Ethylene Copolymer B (part) | Polyfunctional Compound (C) (part) | Polyamide Resin (part) | MI (g/10 min) | Flexural Modulus (kg/cm$^2$) | Izod Impact Strength 23° C. (kg·cm/cm) | Izod Impact Strength −40° C. (kg·cm/cm) | Heat Distortion Temperature (4.6 kg/cm$^2$) (°C.) | Multi-Phase Structure |
|---|---|---|---|---|---|---|---|---|---|---|---|
| Example 1 | A1022S 20 | 86/35 = 2.5 | Copolymer-1 20 | MB-1 4.4 | A1030BRT 55.6 | 5 (230° C.) | 18700 | NB[**] | 15 | 167 | observed (FIG. 1) |
| Comparative Example 1 | A1022S 20 | 86/35 = 2.5 | Copolymer-1 20 | Grilon ® CF6S 4.4 | A1030BRT 55.6 | 2 (230° C.) | 18500 | 28 | 6 | 160 | not observed (FIG. 2) |
| Comparative Example 2 | A1022S 20 A1030BRT 55.6 | — | Copolymer-1 20 | MB-1 4.4 | — | 2 (230° C.) | 17500 | 15 | 4 | 170 | not observed (FIG. 3) |
| Comparative Example 3 | A1020BRL 20 | 84/84 = 1.0 | Copolymer-1 20 | MB-1 4.4 | A1030BRT 55.6 | 0.6 (230° C.) | 18600 | NB | 8 | 168 | substantially not observed (FIG. 4) |
| Example 2 | 1013B 13.3 | 75/39 = 1.9 | Copolymer-1 16.7 | Bondfast ® E 3.3 | A1030BRL 66.7 | 18 (230° C.) | 19100 | NB | 12 | 174 | observed |
| Comparative Example 4 | A1030BRL 13.3 | 60/60 = 1.0 | Copolymer-1 16.7 | Bondfast ® E First E 3.3 | A1030BRL 66.7 | 10 (230° C.) | 19000 | NB | 7 | 175 | substantially not observed |
| Example 3 | 2015B 18 | 86/47 = 1.8 | Copolymer-2 20 | MB-2 2 | 2020B 60 | 11 (280° C.) | 20200 | NB | 15 | 205 | observed (FIG. 5) |
| Comparative Example 5 | A125 18 | 70/56 = 1.25 | Copolymer-2 20 | MB-2 2 | 2020B 60 | 6 (280° C.) | 20100 | NB | 8 | 204 | substantially not observed (FIG. 6) |

Note:
[*]Concentration ratio of terminal carboxyl group (eq./10$^6$ g) to terminal amino group (eq./10$^6$ g)
[**]"NB" means that the sample had an Izod impact strength (notched) of more than 50 kg·cm/cm and did not break.

amine, an ethylene copolymer comprising an ethylene unit and an N,N-dialkylaminoalkyl, $\alpha,\beta$-unsaturated carboxylic acid ester unit, an ethylene copolymer comprising an ethylene unit and an N,N-dialkylaminoalkyl $\alpha,\beta$-unsaturated carboxylic acid amide unit, and a compound having at least two epoxy groups in the molecule thereof, and wherein a part of the polyamide resin (A) constitutes a matrix phase, the ethylene copolymer (B) constitutes a first-order disperse phase, and the remainder of the polyamide resin (A) constitutes a second-order disperse phase in the first-order disperse phase.

2. A multi-phase structure as claimed in claim 1, wherein the ethylene copolymer (B) comprises (a) from 65 to 90% by weight of an ethylene unit, (b) from 10 to 35% by weight of an $\alpha,\beta$-unsaturated carboxylic acid alkyl ester unit, and (c) from 1 to 5% by weight of a maleic anhydride unit, with the sum of the components (a), (b) and (c) being 100% by weight.

3. A multi-phase structure as claimed in claim 1, wherein the compound (C) is an aliphatic diamine carbamate.

4. A multi-phase structure as claimed in claim 1, wherein the polyfunctional compound (C) is an ethylene copolymer comprising an ethylene unit and an N,N-dialkylaminoalkyl $\alpha,\beta$-unsaturated carboxylic acid ester unit, or an ethylene copolymer comprising an ethylene unit and an N,N-dialkylaminoalkyl $\alpha,\beta$-unsaturated carboxylic acid amide unit.

5. A multi-phase structure as claimed in claim 1, wherein the polyfunctional compound (C) is an ethylene copolymer comprising an ethylene unit and a glycidyl $\alpha,\beta$-unsaturated carboxylate unit; an ethylene copolymer comprising an ethylene unit, a glycidyl $\alpha,\beta$-unsaturated carboxylate unit, and an alkyl $\alpha,\beta$-unsaturated carboxylate unit; or an ethylene copolymer comprising an ethylene unit, a glycidyl $\alpha,\beta$-unsaturated carboxylate unit, and a vinyl carboxylate unit.

6. A multi-phase structure as claimed in claim 1, wherein the compound for component (C) is an aliphatic polyamine, and the aliphatic polyamine is an aliphatic diamine.

7. A multi-phase structure prepared by a process comprising:
a step of melt-kneading (A-1) from 20 to 60 parts by weight of a polyamide resin having a concentration ratio of terminal carboxyl group to terminal amino group of 1.5 or more with (B) from 40 to 80 parts by weight of an ethylene copolymer comprising:
(a) from 40 to 90% by weight of an ethylene unit,
(b) from 5 to 60% by weight of an $\alpha,\beta$-unsaturated carboxylic acid alkyl ester unit, and
(c) from 0.3 to 10% by weight of a maleic anhydride unit, with the sum of components (a), (b) and (c) being 100% by weight,
to prepare a composition (I),
a step of melt-kneading 100 parts by weight of the composition (I) with (C) from 0.01 to 20 parts by weight of a compound selected from the group consisting of an aliphatic diamine carbamate, an aliphatic polyamine, an alicyclic polyamine, an aromatic amine, an ethylene copolymer comprising an ethylene unit and an N,N-dialkylaminoalkyl $\alpha,\beta$-unsaturated carboxylic acid amide unit, and a compound having at least two epoxy groups in the molecule thereof to prepare a composition (II), and
a step of melt-kneading 100 parts by weight of the composition (II) with from 50 to 1,000 parts by weight of a polyamide resin.

* * * * *